Dec. 30, 1952 B. I. KAUFMAN 2,623,893
HYDROGENATION OF OXYGENATED ORGANIC COMPOUNDS
Filed Nov. 9, 1948
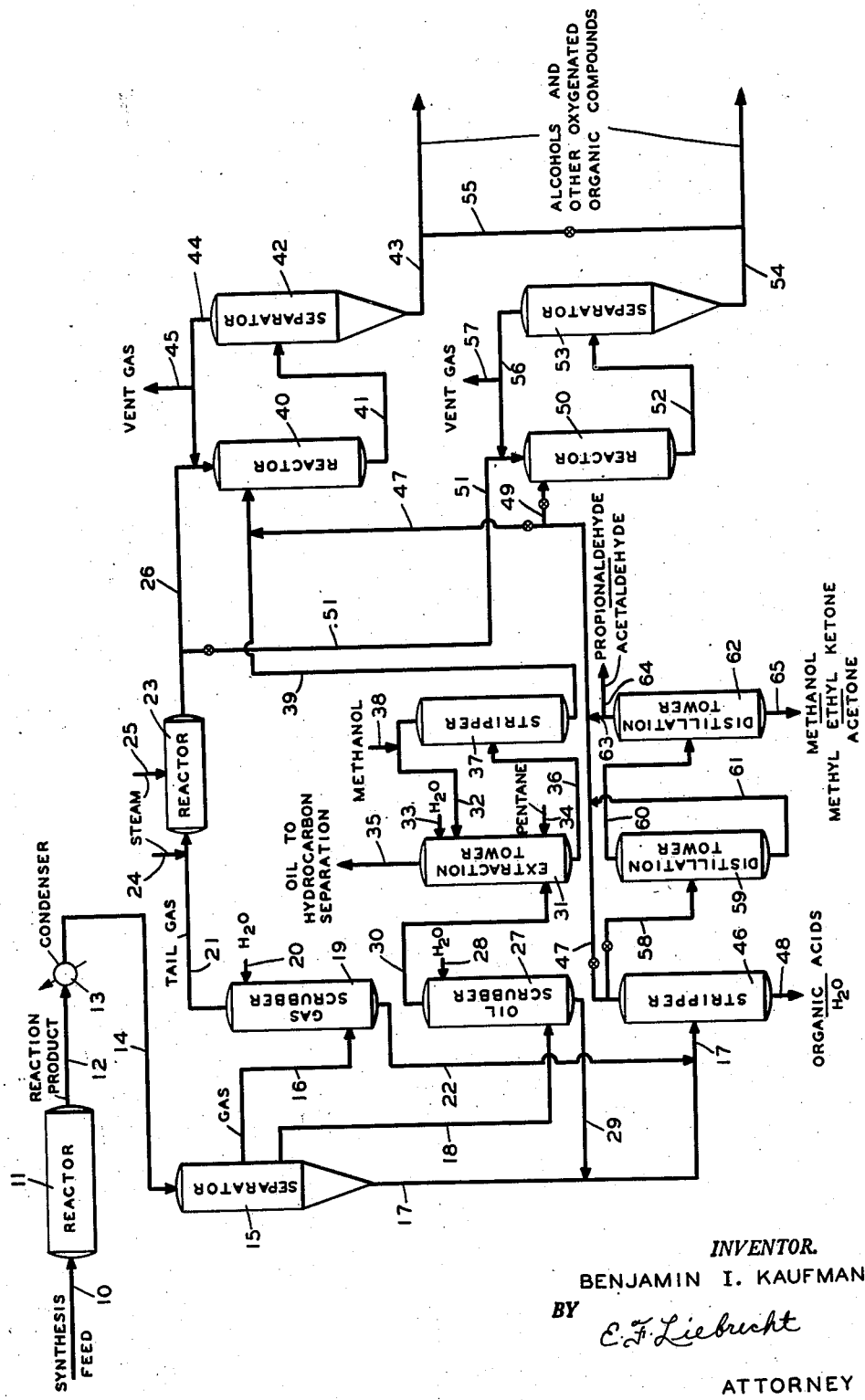
INVENTOR.
BENJAMIN I. KAUFMAN
BY
C. F. Liebrecht
ATTORNEY Patented Dec. 30, 1952

2,623,893

UNITED STATES PATENT OFFICE 2,623,893

HYDROGENATION OF OXYGENATED ORGANIC COMPOUNDS

Benjamin I. Kaufman, New York, N. Y., assignor to The M. W. Kellogg Company, Jersey City, N. J., a corporation of Delaware Application November 9, 1948, Serial No. 59,173

8 Claims. (Cl. 260—450)

This invention relates to the hydrogenation of oxygenated organic compounds. In one aspect, the invention relates to a process for the hydrogenation of aldehydes and ketones to their corresponding alcohols. More particularly, in this aspect, the invention relates to a process for hydrogenating aldehydes and ketones to their corresponding alcohols, wherein these aldehydes and ketones are obtained as products from the hydrogenation of oxides of carbon. Still more particularly, in this aspect, the invention relates to a process for the hydrogenation of aldehydes and ketones present in both a hydrocarbon-rich phase and a water-rich phase obtained from the condensation of the reaction effluent produced in the catalytic hydrogenation of oxides of carbon.

It is known that hydrogen and oxides of carbon, particularly carbon monoxide, may be made to react exothermically in the presence of certain catalysts and under specific reaction conditions to form hydrocarbons having more than one carbon atom per molecule and oxygenated organic compounds, comprising alcohols, aldehydes and ketones, and which may also comprise acids and esters as additional components. In general, the synthesis of hydrocarbons and oxygenated organic compounds by the hydrogenation of carbon monoxide, is accomplished in the presence of a metal or an oxide of a metal, such as one chosen from group VIII of the periodic table, as a catalyst at pressures below about 500 pounds per square inch gage and at temperatures below about 750° F.

Various methods had been practiced to effect the reaction of hydrogen and carbon monoxide to produce organic compounds. Among these methods, are those known as fixed-bed catalyst operations and fluid-bed catalyst operations. The fixed-bed operation comprises passing a reaction mixture of hydrogen and carbon monoxide through a stationary bed of catalyst in a reaction zone, and the fluid-bed operation comprises passing a reaction mixture through a finely divided catalyst mass suspended in the reaction mixture in the reaction zone under conditions such that a so-called pseudo-liquid dense phase of solids is formed. Characteristically, certain reaction conditions are necessary for each of these processes and for the particular catalyst used. The synthesis feed gas or reaction mixture comprises a mixture of about 1 to 5 mols of hydrogen per mol of carbon monoxide and may be prepared by various means including the catalytic conversion of natural gas, steam, and carbon dioxide. It will be understood, however, that while the hydrogenation of carbon monoxide has been referred to specifically, such above-referred hydrogenation is of wider application and includes within its scope the hydrogenation of any suitable carbon oxide.

The reaction effluent thus produced in the aforementioned hydrogenation of an oxide of carbon, comprising hydrocarbons, alcohols, aldehydes, ketones (and which may also comprise other oxygenated organic compounds such as acids or esters as additional components) is obtained in the vapor state in the form of reactor outlet gases. These gases are generally passed through one or more condensation zones in which they are cooled to temperatures within the range from about 40° F. and about 150° F. The resulting condensate then separates into a hydrocarbon-rich phase, a water-rich phase and an uncondensed gas phase, each phase containing the aforementioned oxygenated compounds. In treating the respective phases for the separation of these oxygenated compounds, it has been found highly desirable from an economic standpoint, to convert the total chemicals to alcohols, thus simplifying their recovery which otherwise would normally entail subjecting the total chemicals to a series of diversified treatments in order to obtain the separation of individual classes of oxygenated organic compounds present. In accordance with the aforementioned procedure, the uncondensed gas phase is generally water-scrubbed in one stage of the chemicals recovery, in order to absorb the more volatile oxygenated compounds in the water, which are withdrawn as aqueous bottoms, while the remaining tail-gas, essentially free of oxygenated compounds, is withdrawn overhead and either recycled to the synthesis feed or discarded.

Laboratory analyses of the tail-gas thus obtained, disclose a proportionately high hydrogen content, which may vary from approximately 40% to 70% or even higher. The following table shows representative data obtained from analyses of these tail-gases, indicating that hydrogen constitutes a major component of these gases, with hydrocarbons, carbon monoxide and carbon dioxide present as additional gaseous components in relatively smaller proportions and which may also contain traces of nitrogen.

*Table*

| Analysis No. | $H_2$ | CO | $CO_2$ | Hydrocarbons |
|---|---|---|---|---|
| | Mol Percent | Mol Percent | Mol Percent | Mol Percent |
| 1 | 40 | 16 | 30 | 14 |
| 2 | 48 | 4 | 23 | 25 |
| 3 | 50 | 5 | 25 | 20 |
| 4 | 52 | 19 | 17 | 12 |
| 5 | 71 | 15 | 9 | 5 |

In view of the unusually high hydrogen content of the tail-gases thus obtained from the aforementioned hydrogenation, the process of the present invention contemplates the utilization of these tail-gases as a source of hydrogen for effecting the aforementioned conversion of aldehydes and ketones (which may also include organic acids or esters) to their corresponding alcohols as products of the process, and obtained as mixtures of oxygenated organic compounds from the aforementioned hydrocarbon-rich, water-rich and uncondensed gas phases produced in the catalytic hydrogenation of oxides of carbon. Such hydrogenation of the aforementioned aldehydes and ketones may be carried out under varying conditions, for example, at temperatures varying between about 75° F. and about 500° F., at pressures between about 15 and about 5000 pounds per square inch absolute, in the presence of one or more hydrogenation catalysts such as iron, nickel, cobalt or copper oxide-chromium oxide. However, it should be noted that other conditions of temperature and pressure and other hydrogenation catalysts may also be employed in contacting the aforementioned mixture, comprising aldehydes and ketones, with the aforementioned tail-gas for conversion of these oxygenated organic compounds to their corresponding alcohols.

The tail-gases obtained from the scrubbing of the aforementioned uncondensed gas phase may contain in addition to hydrogen, varying quantities of carbon monoxide, carbon dioxide and hydrocarbons in the gaseous state. The presence of carbon monoxide and hydrocarbons in these tail-gases will not ordinarily effect the operability of the present process in so far as the hydrogenation of aldehydes, ketones or other oxygenated organic compounds to their corresponding alcohols is concerned. However, the presence of carbon monoxide may in some instances poison the hydrogenation catalyst, so that its activity or selectivity in converting the aldehydes, ketones and other oxygenated compounds to alcohols may be impaired.

In order to eliminate the presence of carbon monoxide in these tail-gases prior to the aforementioned aldehyde and ketone hydrogenation, I have found that carbon monoxide present may be converted to methane or carbon dioxide. In effecting the conversion of carbon monoxide to methane, the tail-gas may be passed over a catalyst such as nickel or cobalt, at temperatures within the range from about 400° F. and about 650° F. In effecting the conversion of carbon monoxide to carbon dioxide, steam may be added to the tail-gas and the resulting mixture contacted with a water-gas shift catalyst such as nickel, iron-chromium or cobalt, at a temperature between about 600° F. and about 700° F.

The thus formed methane or carbon dioxide may subsequently be further utilized, following the aforementioned aldehyde-ketone conversion to alcohols, by recycling the remaining gases to the gas-making step when methane is formed, or either to the gas-making or synthesis step when carbon dioxide is formed.

The accompanying drawing illustrates diagrammatically one form of the apparatus employed and capable of carrying out one embodiment of the process of the invention. While the invention will be described in detail by reference to the one embodiment of the process employing the apparatus illustrated in the drawing, it should be noted that it is not intended that the invention be limited to the embodiment as illustrated, but is capable of other embodiments which may extend beyond the scope of the apparatus illustrated. Some of the mechanical elements necessary to effect the transfer of liquids, vapors and reaction products, and to maintain the conditions of temperature and pressure necessary to carry out the function of the apparatus, have been omitted in order to simplify the description. It will be understood, however, that much equipment of this nature is necessary and will be supplied by those skilled in the art.

Referring to the drawing, a synthesis feed comprising a reaction mixture of hydrogen and an oxide of carbon, such as carbon monoxide, at varying mol ratios such as 2:1, is supplied through line 10 and transferred through this line to a synthesis reaction vessel, represented in the drawing by reactor 11. In reactor 11, the reaction mixture is contacted with a hydrogenation catalyst, such as a reduced iron or cobalt catalyst, at temperatures varying between about 300° F. and about 700° F. and at pressures varying between about atmospheric pressure and about 500 pounds per square inch, and is carried out according to conventional fixed-bed or fluid-bed operations. The resulting reaction product obtained from reactor 11 is withdrawn through line 12. This product is in the vapor form, substantially as it comes from the reactor within the aforementioned temperature range, containing water, hydrocarbons, aldehydes, ketones and may include other oxygenated organic compounds such as alcohols, acids or esters and is first cooled to condense substantially large quantities of normally liquid components. Conveniently, condensation may be effected in a plurality of cooling stages which are represented diagrammatically in the drawing by cooler 13 with which line 12 connects. From cooler 13 the resulting mixture of condensate and uncondensed gases passes through line 14 to a separator 15. In separator 15 uncondensed gases are withdrawn through line 16. The condensate in separator 15 separates as a lower aqueous phase and an upper oil phase. The aqueous or water-product liquid phase is drawn off from the bottom of separator 15 through line 17 and the oil-product liquid phase is drawn off at an intermediate point from separator 15 through line 18, for further use and treatment in the process hereinafter described. It should be noted at this point that apparatus embodying more than one separation stage may be employed if desired; for example, primary and secondary stages may be introduced, operating successively and respectively at temperatures of about 150° F. and about 100° F.

The uncondensed gases separated in separator 15 are passed through line 16 to a low point in a suitable scrubbing vessel 19. In this gas scrubber, the gases are intimately contacted with water in order to extract the oxygenated compounds present. For this purpose, water is introduced into scrubber 19 through line 20. The remaining gas, essentially free of oxygenated organic compounds and comprising a proportionately high percentage of hydrogen and relatively smaller proportions of carbon monoxide, carbon dioxide and hydrocarbons, is withdrawn overhead through line 21. The remaining mixture of oxygenated organic compounds comprising alcohols, aldehydes, ketones, acids and esters is transferred from scrubber 19 through line 22 and combined with the aqueous phase withdrawn from separator 15 through line 17, for further treatment in the process hereinafter described.

As indicated above, the remaining tail-gas from scrubber 19, withdrawn through line 21, comprises a proportionately high percentage of hydrogen and relatively smaller proportions of carbon monoxide, carbon dioxide and hydrocarbons and may also contain traces of nitrogen. This gas is next treated to convert carbon monoxide present into either methane or carbon dioxide, in order to avoid impairment of the catalyst in subsequent hydrogenation of aldehydes and ketones to their corresponding alcohols. For this purpose the gas in line 21 is next transferred to a suitable reaction zone, represented diagrammatically in the drawing by reactor 23. In reactor 23 the tail-gas in line 21 is passed over a catalyst such as nickel at a temperature within the aforementioned range from about 400° F. and about 600° F. (although a temperature of approximately 450° F. is preferred) in order to convert carbon monoxide present to methane. If desired, steam may be added to the tail-gas and the resulting mixture contacted with a water-gas shift catalyst such as nickel, iron-chromium or cobalt, at a temperature within the aforementioned range between about 600° F. and about 700° F. in order to convert carbon monoxide present to carbon dioxide and hydrogen. For this purpose, the tail-gas in line 21, may be contacted with steam introduced into line 21 through line 24 or into reactor 23 through line 25. As a result of the treatment in reactor 23 there is obtained a gaseous effluent comprising hydrogen in relatively large quantities and also containing carbon dioxide and hydrocarbons in minor proportions and traces of nitrogen. This effluent is withdrawn from reactor 23 through line 26 for further use in the process hereinafter described.

Returning to the aforementioned oil-product liquid phase withdrawn from separator 15 through line 18 and comprising alcohols, aldehydes, ketones and other oxygenated organic compounds (such as acids or esters) in addition to hydrocarbons, this oil phase is next transferred through line 18 to a low point in an oil scrubber 27, in which the oil is contacted intimately with water to absorb in the water the oxygenated compounds which are dissolved in the oil and which are relatively more soluble in water, such as the relatively low-boiling alcohols, aldehydes, ketones and acids. Water employed for this purpose is introduced to the upper part of scrubber 27 through line 28. The scrubbing water containing dissolved oxygenated compounds is withdrawn from the bottom of oil scrubber 27 through line 29 and is combined with the aforementioned water product liquid phase withdrawn from separator 15 through line 17, with which line 29 connects, for further treatment in the process hereinafter described.

The scrubbed oil is withdrawn overhead from oil scrubber 27 through line 30. This oil comprising essentially a mixture of alcohols, aldehydes, ketones, acids and hydrocarbons is next transferred through line 30 to a low point in an extraction tower 31. In tower 31 the oil introduced through line 30 is subjected to intimate countercurrent contact with a relatively light alcohol as a treating agent, such as methanol, which is introduced into tower 31 at an upper point through line 32. The alcohol treating agent and the oil are contacted in tower 31 under conditions effective to absorb in the treating agent substantially all of the oxygenated compounds contained in the oil and thus effect separation of these oxygenated compounds from hydrocarbons present. As a result of such treatment, a lower aqueous alcohol layer and an upper hydrocarbon or oil layer are formed in tower 31. Inasmuch as anhydrous light alcohols exhibit high solubilities for hydrocarbons as well as for oxygenated compounds, dilution of such alcohols will effect an improvement in the selectivity of extraction, so that absorption of hydrocarbons in the alcohol treating agent is substantially prevented. To obtain such dilution, water is introduced into tower 31 at an upper point above the aforementioned alcohol inlet through line 33. The use of water in the manner described is effective not only for the purpose of alcohol dilution, but its introduction at an upper point in tower 31 accomplishes the result of washing the upper hydrocarbon or oil layer free of the added alcohol treating agent.

Aqueous methanol used as a treating agent in the present embodiment of the invention is not, however, completely selective in effecting total extraction of oxygenated organic compounds from hydrocarbons present in tower 31. Hence, the liquid flowing down tower 31 will contain some hydrocarbons in solution in addition to oxygenated compounds. These hydrocarbons may comprise a mixture of proportionately small quantities of all the hydrocarbons present in the oil stream entering tower 31 through line 30 and would render separation of pure oxygenated compounds highly difficult. A relatively light hydrocarbon stream functioning as a wash-oil is, therefore, introduced at a point near the bottom of tower 31 through line 34. This hydrocarbon stream effects the washing of the lower aqueous methanol layer in tower 31, free of the hydrocarbons contained therein, leaving the methanol layer saturated with the wash-oil. It is desirable that this wash-oil be of such composition that there are no components present in a substantial amount, that are heavier than the highest boiling hydrocarbon which forms an azeotrope with the aforementioned alcohol treating agent. The boiling point of the wash-oil selected must, therefore, be substantially within or below the boiling range of the oxygenated compounds that are to be separated. Hence, such wash-oils may be used as butane, pentane, hexane, or heptane or any mixtures thereof. Following the above-mentioned wash-oil treatment, there is present in tower 31 an upper hydrocarbon or oil layer containing substantially all the hydrocarbons that were present in the oil stream entering tower 31 through line 30 and a portion of the wash-oil; and there is also present a lower aqueous methanol layer saturated with wash-oil and containing extracted oxygenated compounds. The upper hydrocarbon or oil layer is withdrawn overhead as a raffinate from tower 31 through line 35 and is in condition for further use or treatment outside the scope of the present process. The lower aqueous methanol layer is withdrawn as an extract through line 36.

The lower aqueous methanol layer from tower 31, saturated with wash-oil and containing the aforementioned extracted oxygenated compounds comprising a mixture of aldehydes, ketones, alcohols, acids and esters, is next transferred through line 36 to a fractionation tower 37. Tower 37, functioning as a methanol stripper, is operated under conditions effective to separate the aqueous methanol layer transferred from tower 31, into an overhead alcohol fraction comprising essentially methanol and wash-oil which is withdrawn through line 32, and a lower fraction normally consisting of two phases, one phase comprising oxygenated compounds and the other phase comprising water containing some dissolved oxygenated compounds. These combined phases are withdrawn as bottoms through line 39. The overhead alcohol fraction from tower 37 is withdrawn through line 32 as a vapor and is cooled to liquefy methanol and hydrocarbon components present. The mixture of methanol and hydrocarbons thus liquefied is transferred through line 32 into tower 31 for repeated use as the methanol treating agent in the process hereinbefore described. Make-up methanol is introduced into line 32 via line 38, with which line 32 connects. Bottoms from tower 37, comprising an aqueous mixture of oxygenated organic compounds, namely, alcohols, aldehydes, ketones, acids and esters are cooled and transferred through line 39 to a hydrogenation reactor 40. Reactor 40 is provided for effecting catalytic hydrogenation by conventional methods, as previously indicated, of aldehydes and ketones present in the aforementioned mixture to their corresponding alcohols. The source for hydrogen thus employed in reactor 40 is obtained from the aforementioned gaseous effluent withdrawn from reactor 23 through line 26, which enters reactor 40 at an upper point. Following the conversion of aldehydes and ketones into alcohols in reactor 40, the product of the reaction is withdrawn as bottoms through line 41. The bottoms thus obtained are cooled and transferred through line 41 to a separator 42. In separator 42, separation is obtained between alcohols and other oxygenated organic compounds which are withdrawn as a lower phase through line 43, as products of the process, for further use or treatment outside the scope of the present process. Excess hydrogen and other gaseous components from separator 42 are withdrawn through line 44 and are recycled through this line to reactor 40 via line 26, with which line 44 connects, for further use in reactor 40. In order to prevent build-up of undesirable gases in line 44, such as methane or nitrogen, these gases may be vented through line 45 with which line 44 connects.

Returning to the water-product liquid phase withdrawn as bottoms from separator 15 through line 17, this phase contains relatively low molecular weight oxygenated organic compounds comprising alcohols, aldehydes, ketones, acids and esters. This aqueous phase from separator 15, combined with the aforementioned mixture of alcohols, aldehydes, ketones and other oxygenated compounds in line 22, is next transferred through line 17 to a distillation tower 46 which functions as an alcohol stripper. In tower 46 the mixture of oxygenated compounds is heated under proper operating conditions of temperature and pressure effective to distill overhead alcohols, aldehydes, ketones and esters which are withdrawn through valved line 47. Bottoms obtained from tower 46, comprising an aqueous solution of organic acids, are withdrawn through line 48 for further use or treatment outside the scope of the present process.

The overhead from tower 46, comprising a mixture of relatively light alcohols, aldehydes, ketones and esters, is next cooled and transferred through line 47, via valved-line 49, to a hydrogenation reactor 50. Reactor 50 is provided for effecting catalytic hydrogenation by conventional methods, as previously indicated, of aldehydes and ketones present in the aforementioned mixture to their corresponding alcohols. The source for hydrogen thus employed in reactor 50 is obtained from the aforementioned gaseous effluent withdrawn from reactor 23 through line 26 via valved-line 51, which enters reactor 50 at an upper point. Following the conversion of aldehydes and ketones into alcohols in reactor 50, the product of the reaction is withdrawn as bottoms through line 52. These bottoms are cooled and transferred through line 52 to a separator 53. In separator 53, separation is obtained between alcohols and other oxygenated organic compounds which are withdrawn as a lower phase through line 54 as products of the process for further use or treatment outside the scope of the present process. If desired, alcohols and other oxygenated organic compounds present in line 54 may be combined with the aforementioned alcohols and other oxygenated organic compounds in line 43 by transfer through valved-line 55, which connects lines 43 and 54. Similarly, the product in line 43 may be transferred through line 55 to combine with the product in line 54, and the streams thus combined can be withdrawn through line 54.

Excess hydrogen and other gaseous components from separator 53 are withdrawn through line 56 and are recycled through this line to reactor 50 via line 51, with which line 56 connects, for further use in reactor 50. In order to prevent build-up of undesirable gases in line 56, such as methane or nitrogen, these gases may be vented through line 57 with which line 56 connects.

At this point, it should be noted that it is possible to hydrogenate the aforementioned aldehydes and ketones present in line 47 in the same reactor in which the aforementioned aldehydes and ketones present in line 39 are hydrogenated (that is, in reactor 40). For this purpose, the mixture in line 47 may be transferred into reactor 40, via line 39 with which line 47 connects, thus by-passing reactor 50.

In the foregoing embodiment of the process of the invention, it has been indicated that the overhead from tower 46 comprises a mixture of alcohols, aldehydes, ketones and esters which are withdrawn through valved-line 47. In processes for the recovery of oxygenated organic compounds obtained by the catalytic hydrogenation of oxides of carbon, it is often desirable to obtain recovery of such relatively low boiling compounds as acetaldehyde, propionaldehyde, methanol, methyl ethyl ketone and acetone. For this purpose, the overhead from tower 46 may be transferred through valved-line 58, with which line 47 connects, to a distillation tower 59. In tower 59 the mixture is heated under proper operating conditions of temperature and pressure effective to distill overhead the lowest boiling components of the mixture which may be the aforementioned acetaldehyde, propionaldehyde, methanol, methyl ethyl ketone and acetone, and which are withdrawn through line 60. Bottoms from tower 59, comprising relatively light alcohols, ketones and aldehydes, are withdrawn through line 61. These bottoms may contain alcohols having up to eight or more carbon atoms per molecule, aldehydes boiling higher than propionaldehyde; and may contain in addition, ketones, esters, traces of organic acids and water and may be transferred into line 47 with which line 61 connects for further treatment in either reactors 40 or 50 in the process hereinbefore described. The overhead from tower 59 may next be transferred through line 60 to a distillation tower 62. Tower 62 is heated under proper operating conditions of temperature and pressure effective to distill overhead the lowest boiling components of the mixture which boil not higher than propionaldehyde. These components may be withdrawn through line 64, via line 63, with which line 64 connects, for further use or treatment outside the scope of the present process; or they may be transferred through line 63 into line 47, with which line 63 connects, for further treatment in the process as hereinbefore described. Bottoms from tower 62, comprising those oxygenated organic compounds boiling not higher than the boiling point of methyl ethyl ketone (and which may include methanol and acetone), are withdrawn through line 65 for further use or treatment also outside the scope of the present process.

While a particular embodiment of the present invention has been described for the purpose of illustrating the utilization of the aforementioned tail-gas as a source of hydrogen for effecting the aforementioned conversion of aldehydes, ketones and other oxygenated organic compounds to their corresponding alcohols as products of the process, it should be understood that various modifications and adaptations thereof, which will be obvious to one skilled in the art, may be made within the spirit of the invention and set forth in the appended claims.

Having thus described my invention, I claim:

1. A process for producing alcohols which comprises: hydrogenating an oxide of carbon to produce an effluent comprising aldehydes and ketones and including carbon monoxide and unreacted hydrogen; treating said effluent to obtain a liquid phase comprising aldehydes and ketones and a gas phase containing hydrogen as a major component, carbon monoxide and water-soluble oxygenated organic compounds; scrubbing said gas phase with substantially pure water to recover oxygenated organic compounds contained therein and obtain said gas phase substantially free from oxygenated organic compounds; separating aldehydes and ketones from said liquid phase; contacting said water-scrubbed gas phase with a catalyst at a temperature between about 400° F. and about 700° F. to convert carbon monoxide to a product comprising a substantial proportion of a compound selected from the group consisting of carbon dioxide and methane; admixing said thus-treated gas phase with said separated aldehydes and ketones; subjecting the resulting mixture to hydrogenation to convert said aldehydes and ketones to their corresponding alcohols; and recovering said alcohols as products of the process.

2. A process for producing alcohols which comprises: hydrogenating an oxide of carbon to produce an effluent comprising aldehydes and ketones and including carbon monoxide and unreacted hydrogen; treating said effluent to obtain a liquid phase comprising aldehydes and ketones and a gas phase containing hydrogen as a major component, carbon monoxide and water-soluble oxygenated organic compounds; scrubbing said gas phase with substantially pure water to recover oxygenated organic compounds contained therein and obtain said gas phase substantially free from oxygenated organic compounds; separating aldehydes and ketones from said liquid phase; contacting said water scrubbed gas with a hydrogenation catalyst at a temperature between about 400° F. and about 650° F. to convert carbon monoxide to a product comprising a substantial proportion of methane; admixing said thus-treated gas phase with said separated aldehydes and ketones; subjecting the resulting mixture to hydrogenation to convert said aldehydes and ketones to their corresponding alcohols; and recovering said alcohols as products of the process.

3. A process for producing alcohols which comprises: hydrogenating an oxide of carbon to produce an effluent comprising aldehydes and ketones and including carbon monoxide and unreacted hydrogen; treating said effluent to obtain a liquid phase comprising aldehydes and ketones and a gas phase containing hydrogen as a major component, carbon monoxide and water-soluble oxygenated organic compounds; scrubbing said gas phase with substantially pure water to recover oxygenated organic compounds contained therein and obtain said gas phase substantially free from oxygenated organic compounds; separating aldehydes and ketones from said liquid phase; admixing said water-scrubbed gas phase with steam; contacting the resulting mixture with a water-gas shift catalyst at a temperature between about 600° F. and about 700° F. to convert carbon monoxide to a product comprising a substantial proportion of carbon dioxide; admixing said thus-treated gas phase with said separated aldehydes and ketones; subjecting the resulting mixture to hydrogenation to convert said aldehydes and ketones to their corresponding alcohols; and recovering said alcohols as products of the process.

4. A process for producing alcohols which comprises: hydrogenating an oxide of carbon to produce an effluent comprising aldehydes and ketones and including carbon monoxide and unreacted hydrogen; treating said effluent to form an oil-product liquid phase comprising aldehydes and ketones and a gas phase containing hydrogen as a major component, carbon monoxide and water-soluble oxygenated organic compounds; scrubbing said gas phase with substantially pure water to recover oxygenated organic compounds contained therein and obtain said gas phase substantially free from oxygenated organic compounds; separating aldehydes and ketones from said oil-product liquid phase; contacting said water-scrubbed gas phase with a hydrogenation catalyst at a temperature between about 400° F. and about 650° F. to convert carbon monoxide to a product comprising a substantial proportion of methane; admixing said thus-treated gas phase with said separated aldehydes and ketones; subjecting the resulting mixture to hydrogenation to convert said aldehydes and ketones to their corresponding alcohols; and recovering said alcohols as products of the process.

5. A process for producing alcohols which comprises: hydrogenating an oxide of carbon to produce an effluent comprising aldehydes and ketones and including carbon monoxide and unreacted hydrogen; treating said effluent to form a water-product liquid phase comprising aldehydes and ketones and a gas phase containing hydrogen as a major component, carbon monoxide and water-soluble oxygenated organic compounds; scrubbing said gas phase with substantially pure water to recover oxygenated organic compounds contained therein and obtain said gas phase substantially free from oxygenated organic compounds; separating aldehydes and ketones from said water-product liquid phase; contacting said water-scrubbed gas phase with a hydrogenation catalyst at a temperature between about 400° F. and about 650° F. to convert carbon monoxide to a product comprising a substantial proportion of methane; admixing said thus-treated gas phase with said separated aldehydes and ketones; subjecting the resulting mixture to hydrogenation to convert said aldehydes and ketones to their corresponding alcohols; and recovering said alcohols as products of the process.

6. A process for producing alcohols which comprises: hydrogenating an oxide of carbon to produce an effluent comprising aldehydes and ketones and including carbon monoxide and unreacted hydrogen; treating said effluent to form an oil-product liquid phase comprising aldehydes and ketones and a gas phase containing hydrogen as a major component, carbon monoxide and water-soluble oxygenated organic compounds; scrubbing said gas phase with substantially pure water to recover oxygenated organic compounds contained therein and obtain said gas phase substantially free from oxygenated organic compounds; separating aldehydes and ketones from said oil-product liquid phase; admixing said water-scrubbed gas phase with steam; contacting the resulting mixture with a water-gas shift catalyst at a temperature between about 600° F. and about 700° F. to convert carbon monoxide to a product comprising a substantial proportion of carbon dioxide; admixing said thus-treated gas phase with said separated aldehydes and ketones; subjecting the resulting mixture to hydrogenation to convert said aldehydes and ketones to their corresponding alcohols; and recovering said alcohols as products of the process.

7. A process for producing alcohols which comprises: hydrogenating an oxide of carbon to produce an effluent comprising aldehydes and ketones and including carbon monoxide and unreacted hydrogen; treating said effluent to form a water-product liquid phase comprising aldehydes and ketones and a gas phase containing hydrogen as a major component, carbon monoxide and water-soluble oxygenated organic compounds; scrubbing said gas phase with substantially pure water to recovery oxygenated organic compounds contained therein and obtain said gas phase substantially free from oxygenated organic compounds; separating aldehydes and ketones from said water-product liquid phase; admixing said water-scrubbed gas phase with steam; contacting the resulting mixture with a water-gas shift catalyst at a temperature between about 600° F. and about 700° F. to convert carbon monoxide to a product comprising a substantial proportion of carbon dioxide; admixing said thus-treated gas phase with said separated aldehydes and ketones; subjecting the resulting mixture to hydrogenation to convert said aldehydes and ketones to their corresponding alcohols; and recovering said alcohols as products of the process.

8. A process for producing alcohols which comprises: hydrogenating an oxide of carbon to produce an effluent comprising aldehydes and ketones and including carbon monoxide and unreacted hydrogen; treating said effluent to form an oil-product liquid phase and a water-product liquid phase, each of said phases comprising aldehydes and ketones, and a gas phase containing hydrogen as a major component, carbon monoxide and water-soluble oxygenated organic compounds; scrubbing said gas phase with substantially pure water to recover oxygenated organic compounds contained therein and obtain said gas phase substantially free from oxygenated organic compounds; separating aldehydes and ketones from said oil product liquid phase and said water product liquid phase; combining aldehydes and ketones thus separated; contacting said water-scrubbed gas phase with a catalyst at a temperature between about 400° F. and about 700° F. to convert carbon monoxide to a product comprising a substantial proportion of a compound selected from the group consisting of carbon dioxide and methane; admixing said thus-treated gas phase with said combined aldehydes and ketones; subjecting the resulting mixture to hydrogenation to convert said aldehydes and ketones to their corresponding alcohols; and recovering said alcohols as products of the process.

BENJAMIN I. KAUFMAN.

REFERENCES CITED

The following references are of record in the file of this patent:

UNITED STATES PATENTS

| Number | Name | Date |
|---|---|---|
| 1,684,640 | Schmidt et al. | Sept. 18, 1928 |
| 1,979,841 | Pier et al. | Nov. 6, 1934 |
| 2,059,495 | Smeykal | Nov. 3, 1936 |
| 2,171,324 | Zetzsche | Aug. 29, 1939 |
| 2,234,941 | Keith | Mar. 11, 1941 |
| 2,464,916 | Adams et al. | Mar. 22, 1949 |
| 2,465,462 | Layng | Mar. 29, 1949 |
| 2,516,940 | Arnold et al. | Aug. 1, 1950 |
| 2,569,380 | Holder | Sept. 25, 1951 |

OTHER REFERENCES

U. S. Naval Tech. Miss. in Europe, "Synth. of Hydrocarbons and Chemicals From CO and $H_2$," pages 78–79, August 2, 1946.